US007428115B2

(12) United States Patent
Nakagawa et al.

(10) Patent No.: US 7,428,115 B2
(45) Date of Patent: Sep. 23, 2008

(54) MAGNETIC HARD DISK DRIVE WITH COUNTERMEASURE AGAINST SPIKE NOISE

(75) Inventors: Takeshi Nakagawa, Kanagawa (JP); Ikuya Tagawa, Kanagawa (JP); Atsushi Kikugawa, Tokyo (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 421 days.

(21) Appl. No.: 11/104,011

(22) Filed: Apr. 11, 2005

(65) Prior Publication Data

US 2005/0233177 A1    Oct. 20, 2005

(30) Foreign Application Priority Data

Apr. 14, 2004   (JP)   ............... 2004-119197

(51) Int. Cl.
  *G11B 5/02*   (2006.01)
  *G11B 5/127*  (2006.01)
(52) U.S. Cl. ..................... 360/55; 360/25; 360/110
(58) Field of Classification Search ............... None
  See application file for complete search history.

(56) References Cited

U.S. PATENT DOCUMENTS 6,324,032 B1 *  11/2001  Ohtsuka et al. ............ 360/131
2002/0034052 A1 *  3/2002  Takeo et al. ............... 360/264.7
2004/0150912 A1 *  8/2004  Kawato et al. ............. 360/126

FOREIGN PATENT DOCUMENTS

| JP | 2002-100020 | 4/2002 |
| JP | 2002-298326 | 10/2002 |
| JP | 2003-045015 | 2/2003 |
| JP | 2003-168207 | 6/2003 |

OTHER PUBLICATIONS

Darragh et al., "Observation of Underlayer Domain Noise in Perpendicular Recording Disks," IEEE Transactions on Magnetics, vol. 29, No. 6, (Nov. 1993), pp. 3742-3744.

* cited by examiner

*Primary Examiner*—Joseph Feild
*Assistant Examiner*—Daniell L Negrón
(74) *Attorney, Agent, or Firm*—Townsend and Townsend and Crew LLP; Darren Gold (57) ABSTRACT

Embodiments of the invention provide a countermeasure against spike noise maintaining the data reliability of a magnetic recording layer. In one embodiment, the magnetic domain state right below and around the read head of the soft magnetic layer in the recording medium is locally and temporarily equalized using the write head, whereby, the effect of the spike noise caused by the magnetic domain boundaries (magnetic domain walls) of the soft magnetic layer on the read waveform is prevented. The read retry action of the magnetic hard disk drive is used as the trigger for the timing of the magnetic field application, thereby shortening the time for the magnetic field application.

18 Claims, 9 Drawing Sheets

Befor applying magnetic field
After applying magnetic field

A. normal structure head magnitude of magnetic field at MR reader element: about 5 Oe B. writer-readder reverse structure head magnitude of magnetic field at MR reader element: about 20 Oe C. head with extra coil magnitude of magnetic field at MR reader element: about 20 Oe

MAGNETIC HARD DISK DRIVE WITH COUNTERMEASURE AGAINST SPIKE NOISE

CROSS-REFERENCES TO RELATED APPLICATIONS

This application claims priority from Japanese Patent Application No. JP2004-119197, filed Apr. 14, 2004, the entire disclosure of which is incorporated herein by reference.

BACKGROUND OF THE INVENTION

The present invention relates to a magnetic hard disk drive which records and reproduces magnetic information by a perpendicular recording system using a recording medium including a soft magnetic layer.

The one, which has been widely investigated as an appropriate geometry for putting into practical use a magnetic hard disk using a perpendicular recording method, uses a magnetic inductive read head, wherein a single magnetic pole type write head is used as a write element, a multi-layer structured perpendicular recording medium including a soft magnetic layer (so-called soft magnetic lining layer) is used as a recording medium, and a magnetoresistive effect (MR effect) is used as a read element. However, heretofore, the generation of noise caused by magnetic domain walls formed inside the soft magnetic layer in the recording medium, so-called spike noise, has been confirmed (for instance, IEEE TRANSACTIONS ON MAGNETICS, VOL. 29, NO. 6, NOVEMBER 1993, pp. 3742-3744). Spike noise is a noise, which is superimposed on a read waveform when the read head passes over a magnetic domain wall (boundary of a magnetic domain) generated inside the soft magnetic layer of the recording medium, and has the following characteristics.

(1) The generation site is irregular (it is not always generated at a specific site in the recording medium).
(2) It moves (it is likely to move to other places when information is rewritten on the site where spike noise is generated).
(3) It becomes a long error (superimposition of the spike noise causes a base line shift and a distortion in the read waveform and introduces reading errors; the length reaches several ten to several hundred micrometers (corresponding to several hundred to several thousand bits) although it depends on the size of the magnetic domain wall).

Heretofore, as measures to counter such spike noise, various techniques for preventing the creation of noise-causing magnetic domain walls inside the soft magnetic layer while fabricating a recording medium have been examined and proposed (for instance, see JP-A No. 298326/2002, No. JP-A No. 168207/2003, and JP-A No. 45015/2003.

On the other hand, measures have been examined to counter the spike nose generated in spite of the above-mentioned countermeasures, such as using a TA (Thermal Asperity) compensation function in the reproducing signal processing LSI or registering it as a defect in the medium defect registration processing before product shipment. However, because the TA compensation function of a commercial LSI assumes that the base line shift of the length is only at most on the order of several tens of bits, there is difficulty dealing with the spike noise. In addition, even if medium defect registration processing is attempted, there is also difficulty because the location of the spike noise is irregular; therefore, a definitive solution has not been found yet. Moreover, in JP-A No. 100020/2002, a means is described in which a magnetic field is always applied to the recording medium using a permanent magnet and the entire soft magnetic layer or a wide area is uniformly magnetized to prevent generation of magnetic domain walls.

BRIEF SUMMARY OF THE INVENTION

Countermeasures against the aforementioned spike noise are necessary in the practical use of a magnetic hard disk device with a perpendicular recording method using a multi-layer structured recording medium including a soft magnetic layer. There are many conventional measures to counter spike noise relating to magnetic domain control of the soft magnetic layer in the recording medium, and they have been put forward from the viewpoint of how to fabricate a spike-less recording medium. On the other hand, the countermeasures are not good enough for a magnetic hard disk drive using a medium in which there is remaining spike noise caused by reasons such as inadequate magnetic domain control, etc. With the means disclosed in JP-A No. 100020/2002, concern from the viewpoint of reliability of the magnetic hard disk drive remains when a magnetic field is always applied inside the device, albeit minute.

It is a feature of the present invention to provide a countermeasure against spike noise which has already been generated in the device, and to provide a magnetic hard disk drive with high data reliability, even if a recording medium is used in which spike noise has been generated.

The present invention creates a condition in which there is no magnetic domain wall in the reading region, at least while operating the read head, by locally and temporarily equalizing the magnetic domain state inside the soft magnetic layer of the recording medium by a very little DC magnetic field during the reproducing operation, thereby preventing the effects of spike noise on the reproducing signal. Concretely, it is the one that provides a mechanism for applying a DC magnetic field of predetermined strength for a predetermined period to around the data reading region of the read head inside the soft magnetic layer of the recording medium, and provides a function which makes the read-retry processing of the magnetic hard disk drive a trigger for timing the application of the DC magnetic field in question. If the magnetic domain walls which cause the spike noise can be moved right below the read element or dissolved by applying a very little DC magnetic field, the possibility of success in reproduction becomes higher.

According to the present invention, a reproducing signal with high reliability can be obtained even if a recording medium is used, in which either spike noise is generated or there is a possibility to generate spike noise.

DETAILED DESCRIPTION OF THE INVENTION

Figure 1:
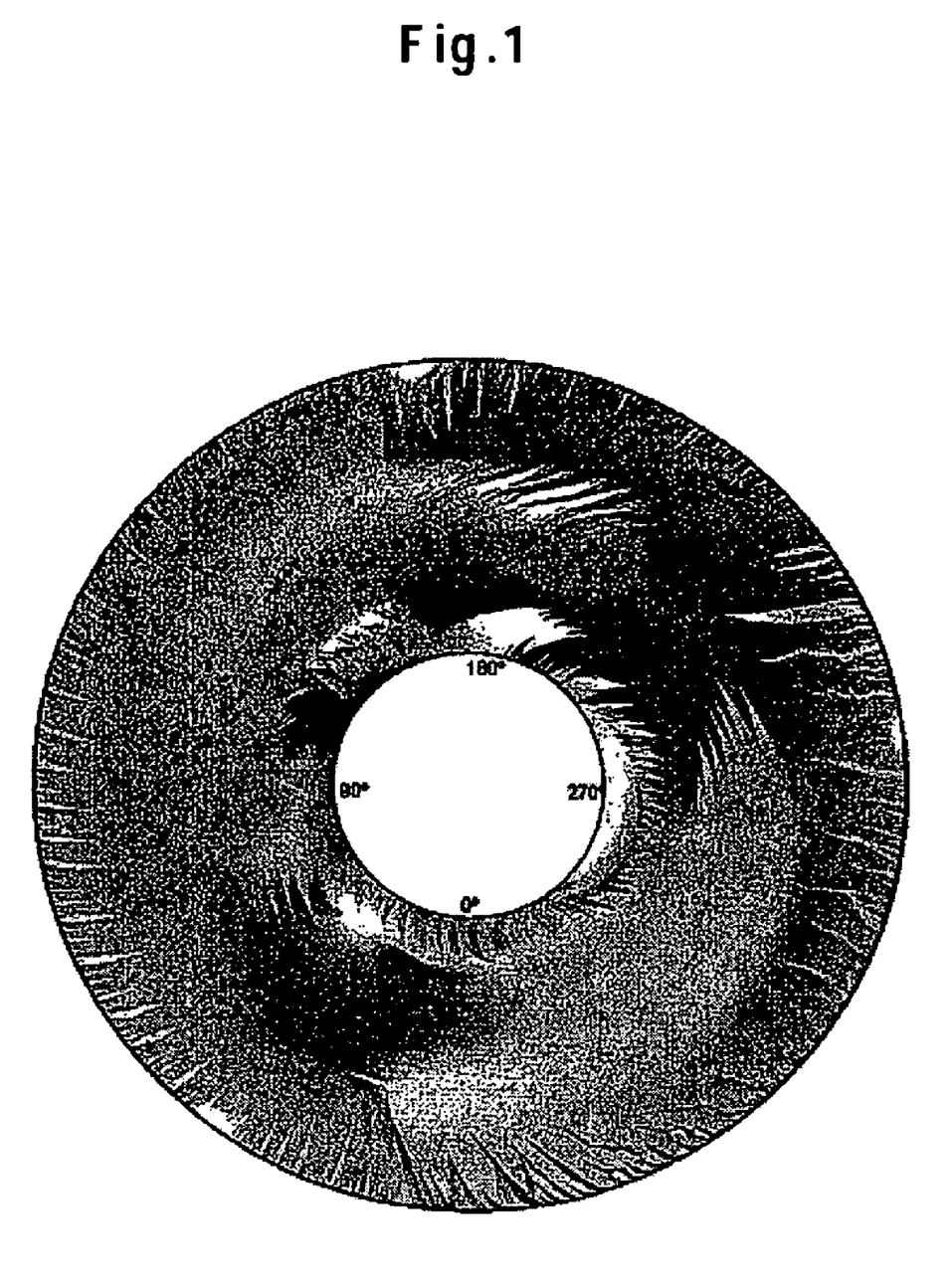
FIG. 1 is an image of the observed magnetic domain state of the soft magnetic layer using a Kerr effect measurement device.
Figure 2:
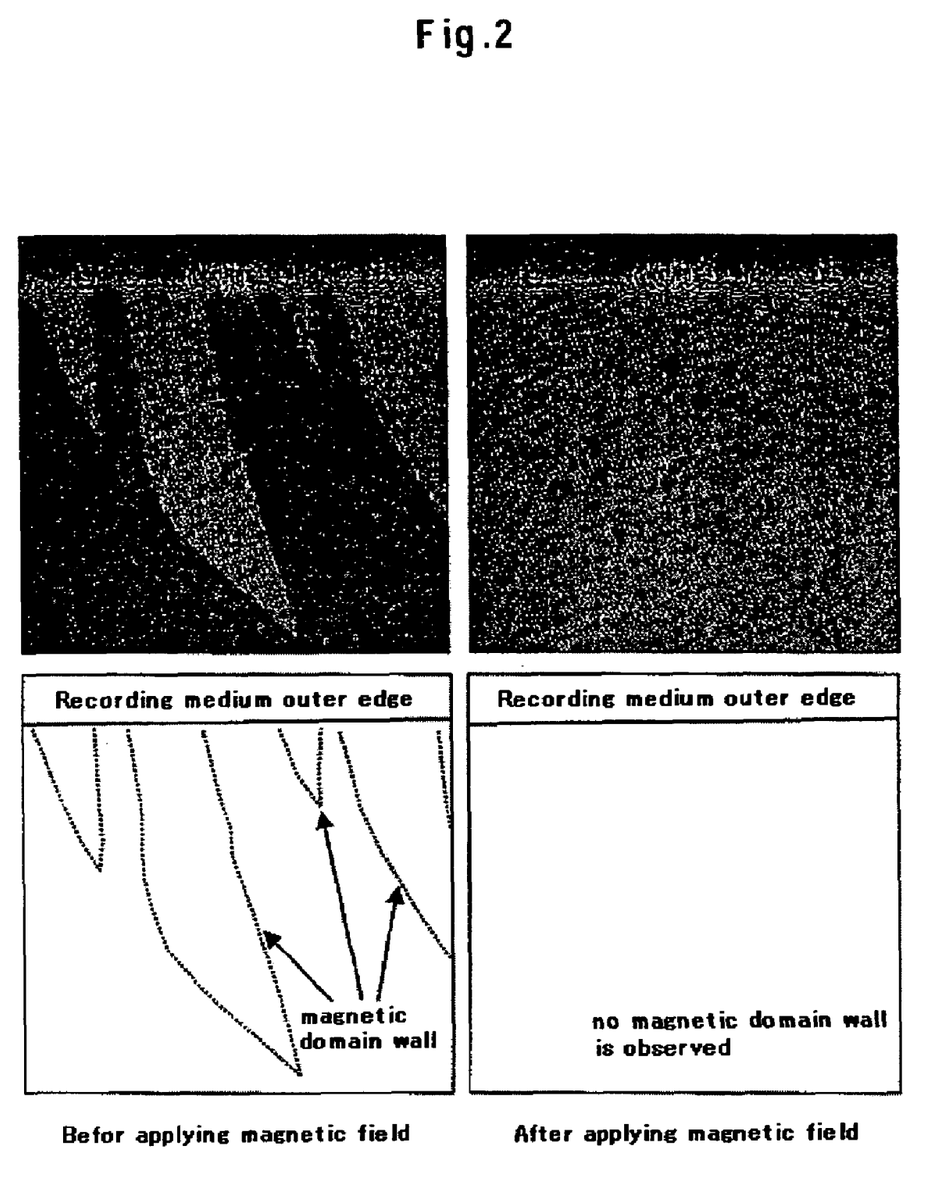
FIG. 2 is a schematic drawing of an image and positions of magnetic domain walls obtained by the observation of a change of the magnetic domain of a soft magnetic layer using a Kerr effect measurement device before and after applying a magnetic field in in-plane direction.

A double layered magnetic recording medium is a magnetic recording medium which has a soft magnetic layer and a recording magnetic layer on a substrate. The magnetic domain state of the soft magnetic layer can be measured by a Kerr effect measurement device. When special control of magnetic domains is not carried out, the existence of many magnetic domain walls can be confirmed as shown in FIG. 1 (the contrast borders in the FIG. are the magnetic domain walls). Since magnetic domains in the soft magnetic layer change with slight changes in the external magnetic field, the generation site of a magnetic domain wall is not always regular. That is, the generation site of spike noise is also irregular. On the other hand, because of the character to react against the slight external magnetic field, it is confirmed that the magnetic domain walls vanish or move as shown in FIG. 2 by applying a very little DC magnetic field of about several Oe (Oersted) to the soft magnetic layer along the in-plane direction.

By using this character, it is possible to move or make vanish the magnetic domain wall inside the soft magnetic layer and to prevent the effects of spike noise on the reproducing waveform by applying a micro DC magnetic field to the soft magnetic field along the in-plane direction, the magnitude of the field being of a degree moving the magnetic domain wall inside the soft magnetic layer in the recording medium and not affecting the read head and recording magnetization recorded in the recording magnetic layer. Moreover, if the entire soft magnetic layer of the recording medium is not magnetized uniformly, but the magnetic domain wall can be blocked out of the soft magnetic layer right below and the neighboring read head, which is a reading area of the read head, it is thought to be possible to prevent the spike noise from the read head.

Based on such knowledge, in the present invention the area of application of the magnetic field to the soft magnetic layer is limited to the vicinity of the data reading area of the read head, and the application time is not always regular, but a short time which uses the read-retry processing of the magnetic hard disk drive as a trigger. Moreover, as a way of generating the magnetic field in question, a magnetic field generating element is used, which is printed separately on the write head located on the same slider as the read head or on the same slider.

Figure 3:
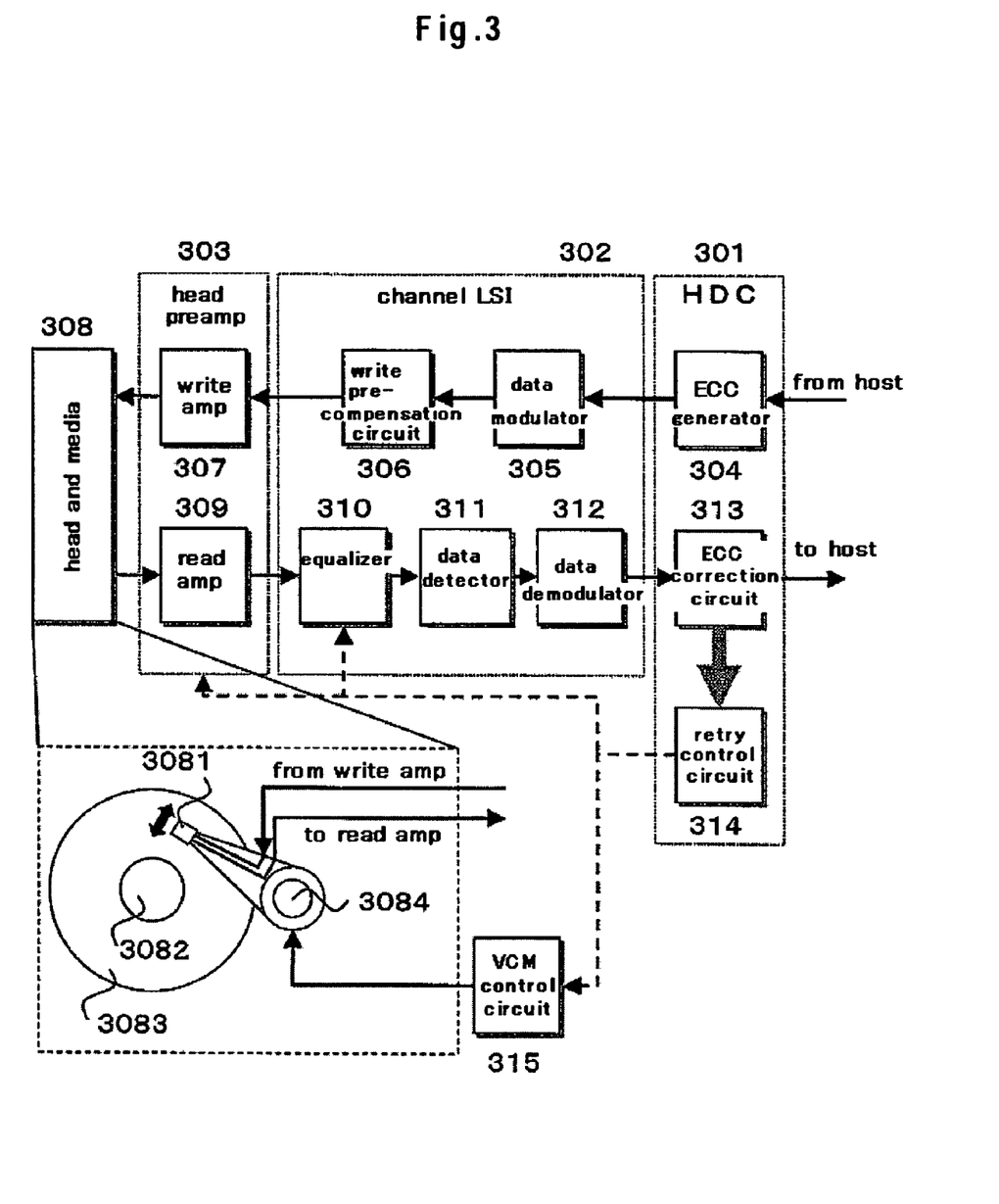
FIG. 3 is a schematic block diagram illustrating a magnetic hard disk drive according to an embodiment of the present invention.

FIG. 3 is a schematic block diagram illustrating a magnetic hard disk drive according to an embodiment of the present invention. The magnetic hard disk drive comprises a disk-shaped magnetic recording medium 3083, a spindle motor 3082 rotary-driving the recording medium 3083, and an actuator moving the read/write head 3081 to a predetermined track of the recording medium. The actuator includes an arm including the head 3081 and voice coil motor 3084 which moves the arm in the radial direction on the recording medium. The magnetic recording medium is a double layered medium in which a soft magnetic layer such as CoTaZr, etc. is deposited on a glass or aluminum substrate, and a recording magnetic layer and surface protection layer of the CoCrPt system are laminated on top of it. The soft magnetic layer and recording medium are not only single composition, but each layer may also have a multi-layered structure. Moreover, inside the drive enclosure is placed a circuit board in which the head preamplifier is mounted. The head amplifier circuit is connected to the head 3081 through the FPC (Flexible Print Cable) and transmits the data and control signal during recording and reproducing.

An error correction code is added to the recording data transmitted from the higher host at the ECC (Error Correction Code) generating circuit 304 in the HDC (Hard Disk Controller) 301. Then, it is converted to a data sequence which makes the data error smaller by the data modulator 305 in the channel LSI 302, and transmitted to the head amplifier 303 through the write pre-compensation circuit 306. The recording data are expressed as a change in a predetermined current value by the write amplifier 307 in the head amplifier, and then converted into a magnetic field change by the write element of the read/write head 3081 in the head amplifier medium 308. The above is the write process. In the read process, the waveform, which is read from the recording medium as a voltage change using the read element of the read/write head 3081, is transmitted to the equalizer 310 and the data detector 311 of the channel LSI 302 through the read amplifier 309 in the head amplifier 303. The combination of the equalizer and the data detector is known as a PRML circuit; it reshapes (=equalizes) the waveform into the desired characteristics with filters, etc., and the data are detected with maximum likelihood from the waveform. Then, the detected data undergo a process opposite that of the data modulator by the data demodulator 312 and are returned to the host after detection of data error and correction processing at the ECC correction circuit 313 in the HDC.

Next, the read-retry processing of the magnetic hard disk drive will be explained. Generally, in the ECC, the correction capability of M-bit data errors and the detection capability of N-bit data errors are provided. Here, M and N are assumed to be positive integers with $M \leqq N$. That is, data errors up to a maximum of M bits can be corrected in the ECC correction circuit. Data errors greater than M bits and smaller than N bits cannot be corrected, but can be detected. Using this, a process, which tries to read the same data again when data error is detected during data reproduction, although it could not be corrected by the ECC correction circuit (read error), is generally called read-retry. Concretely, in the case when an error is detected, a designation is given to the retry control circuit 314 from the ECC correction circuit 313, and a read-retry is executed. The retry process is executed until the data are read without error up to the maximum limit of a predetermined number R. In the case when the data cannot be read even after retrying R times, the reading error is reported to the host. Although it has been described that the read-retry is executed a maximum of N times, in general, the same process is not done all the time. For instance, a regular reproduction process is executed in the first retry, but, because of this, it is expected to recover a read error caused by a temporary malfunction of the read head. Moreover, it may give a designation to the VCM control circuit, and attempt to reproduce by shifting the head slightly. What can be recovered by this measure is a read error mainly caused by shifting the head from the predetermined position during recording. Another way of attempting reproduction is to send a designation to the equalizer 310 and change the equalization parameter. Combining these can handle read errors caused by variety of reasons.

The head amplifier 303 of the magnetic hard disk drive of the present embodiment is one having a mode able to make the recording current supply/write amplifier active during the above-mentioned reproducing operation, and retry control signal is also input into this head amplifier 303. This signal is assumed to be a composition which becomes active in the case when the regular retry exceeds a specified number R.

Figure 4:
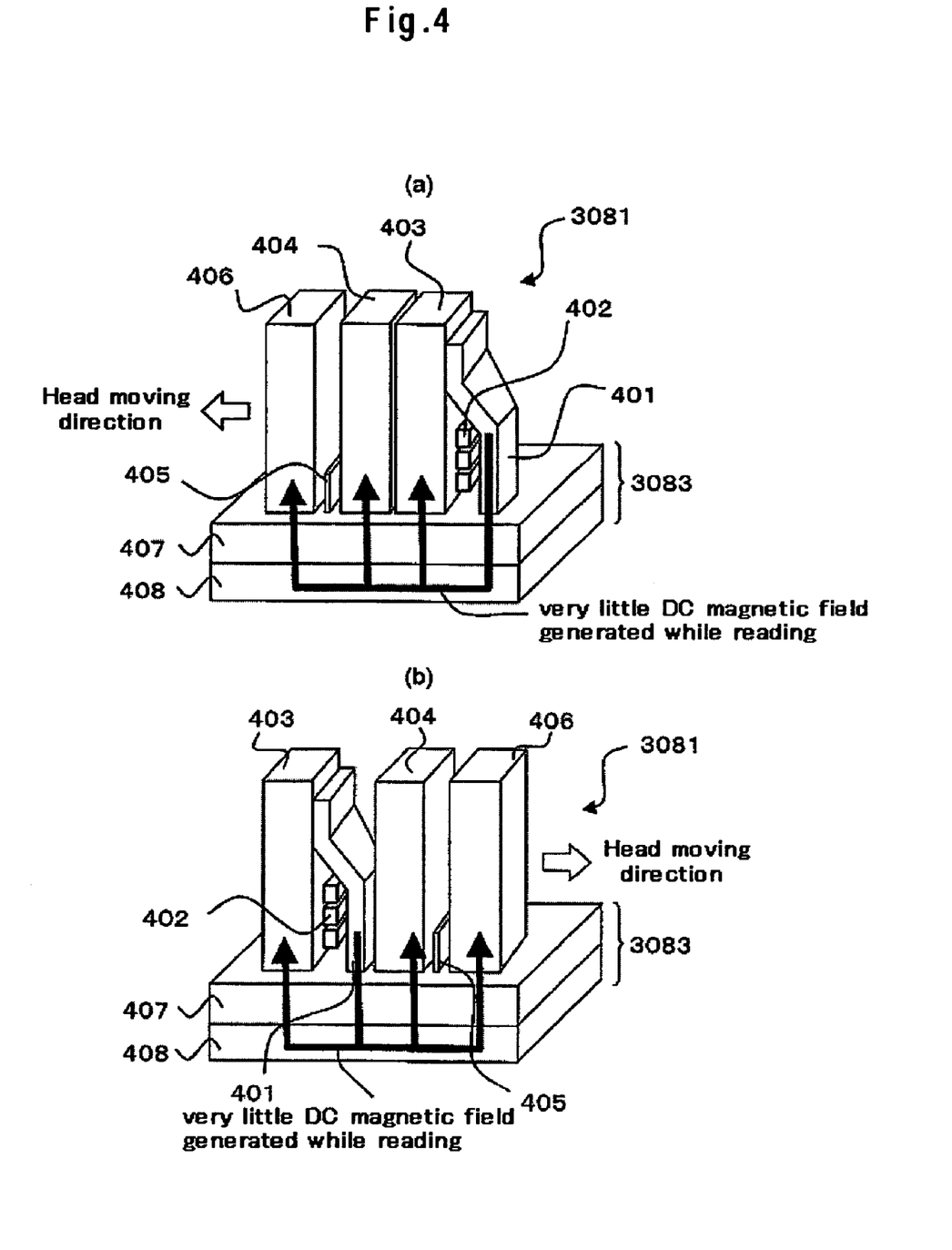
FIG. 4 is a structural example of a read/write head (normal structure and writer-reader reverse structure) according to an embodiment of the present invention.

FIG. 4 is a structural example of a read/write head 3081 according to an embodiment of the present invention. The read/write head illustrated in (a) and (b) in FIG. 4 comprises the single magnetic pole type write head constituting the main pole 401 and the auxiliary magnetic pole 403 as a write head, and comprises an MR reader element 405 as a read head. The excitation coil 402 is formed interlinking with the magnetic circuit formed by the main pole 401 and the auxiliary magnetic pole 403. While recording, a magnetic field (recording magnetic field) is generated from the main pole 401 excited by the excitation coil 402 and the information is recorded in the recording magnetic layer 407 of the recording medium 3083. Moreover, the recording magnetic field returns to the auxiliary magnetic pole 403 through the soft magnetic layer 408, thus forming a closed magnetic circuit. During reproducing, the leakage field from the recording magnetic layer 407 of the recording medium 3083 is detected by the MR reader element 405 and, thereby, the information is read as a deviation in the voltage.

The MR shields 404 and 406 exclude the magnetic field from the area where the data are read, and work to improve the sensitivity of the read head.

In the read/write head shown in FIG. 4(a), the elements are arranged from the head moving direction in the order of MR shield, MR reader element, MR shield, auxiliary magnetic pole, excitation coil, and main pole. On the other hand, the differences in the read/write head shown in FIG. 4(b) are that the elements are arranged from the head moving direction in the order of MR shield, MR reader element, MR shield, main pole, excitation coil, and auxiliary magnetic pole. Hereinafter, the head having the structure shown in FIG. 4(a) and the head having the structure shown in FIG. 4(b) are called a normal structure head and a writer-reader reverse structure head, respectively. In the normal structure head shown in FIG. 4(a), one of the MR shields 404 may form a monolithic structure with the auxiliary magnetic pole 403.

In a write head of a conventional read/write head, a magnetic field is generated from the main pole 401 while recording and not generated while reproducing. The read/write head 3081 of the present embodiment also does not generate a magnetic field from the write head while reproducing in regular operation mode.

However, when the read-retry process is executed and the number of retries reaches a predetermined number, a signal is transmitted from the retry control circuit 314 to the write amplifier 307 of the head amplifier, a very little DC magnetic field is generated from the write head during the reproducing operation as shown in this figure, and the magnetic field is applied to the soft magnetic layer 408. The magnitude of the generated DC magnetic field is strong enough to move the magnetic domain wall generated in the soft magnetic field layer 408 and small enough not to affect the recording magnetization or MR reader element 405 of the recording magnetic layer. The reproducing operation is executed while applying a very little DC magnetic field from the record head to the soft magnetic layer.

Figure 5:
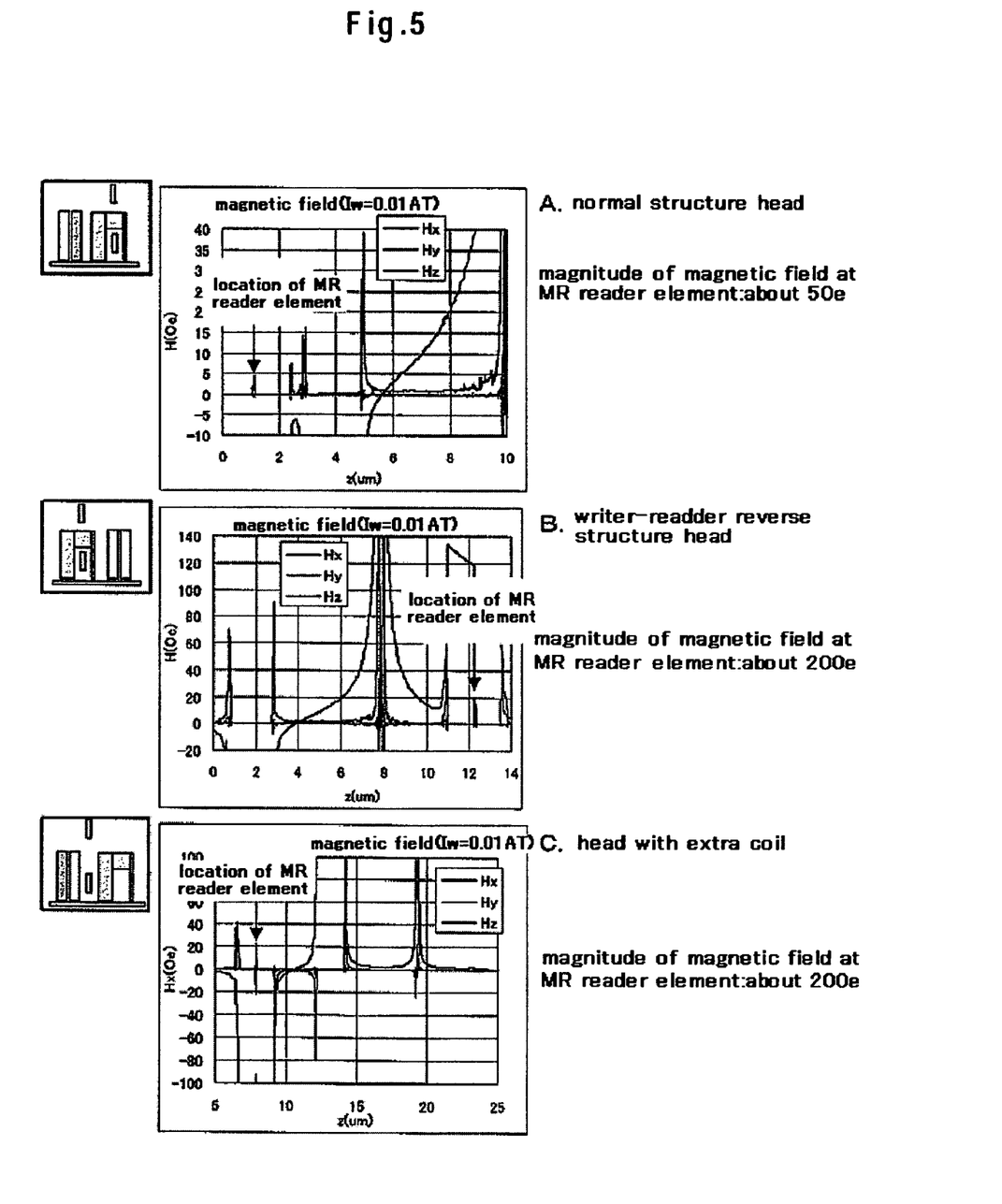
FIG. 5 is a set of graphs showing the simulation results of the magnitude of magnetic field at the read/write heads with the normal structure, the writer-reader reverse structure head, and the magnetic field generating coil.

FIG. 5 are graphs showing the simulation results of the magnitude of magnetic field at the location of the MR reader element. The simulations were carried out using 3-dimensional finite element methods taking into consideration the dimensions of the existing heads. In the case when the same excitation energy (0.01 AT) is applied, the in-plane component of the magnetic field at the location of the MR reader element of the normal structure head (FIG. 5(a)) is less than 50 Oe; on the other hand, the in-plane component of the magnetic field at the location of the MR reader element of the writer-reader reverse structure head (FIG. 5(b)) is less than 20 Oe. In this experiment about 0.01 AT of excitation energy is good enough for the writer-reader reverse structure head because 20 Oe is assumed to be the magnitude of the in-plane magnetic field which is necessary to move (or delete) the magnetic domain walls, and an excitation energy greater than 0.01 AT is necessary for the normal structure head (if simple linearity holds, four times larger or 0.04 AT).

Thus, in the writer-reader reverse structure head, it can be confirmed from the simulation that the excitation energy applied to the main pole may be smaller than the normal structure head because a predetermined very little DC magnetic field is generated in the soft magnetic layer right below the MR reader element.

This is because the distance between the main pole and the MR reader element can be made smaller in the writer-reader reverse structure head compared with the normal structure head. That is, the excitation coil, the auxiliary magnetic pole, and the MR shield are between the main pole and the MR reader element in the normal structure head, but, on the other hand, only the MR shield exists between the main pole and the MR reader element in the writer-reader reverse structure head. Reducing the excitation energy applied to the main pole during the reproducing operation means that the effect of a very little DC magnetic field, a countermeasure against spike noise, on the recording magnetic layer right below the main pole can be made smaller, whereby, improvements in data reliability can be expected.

Figure 6:
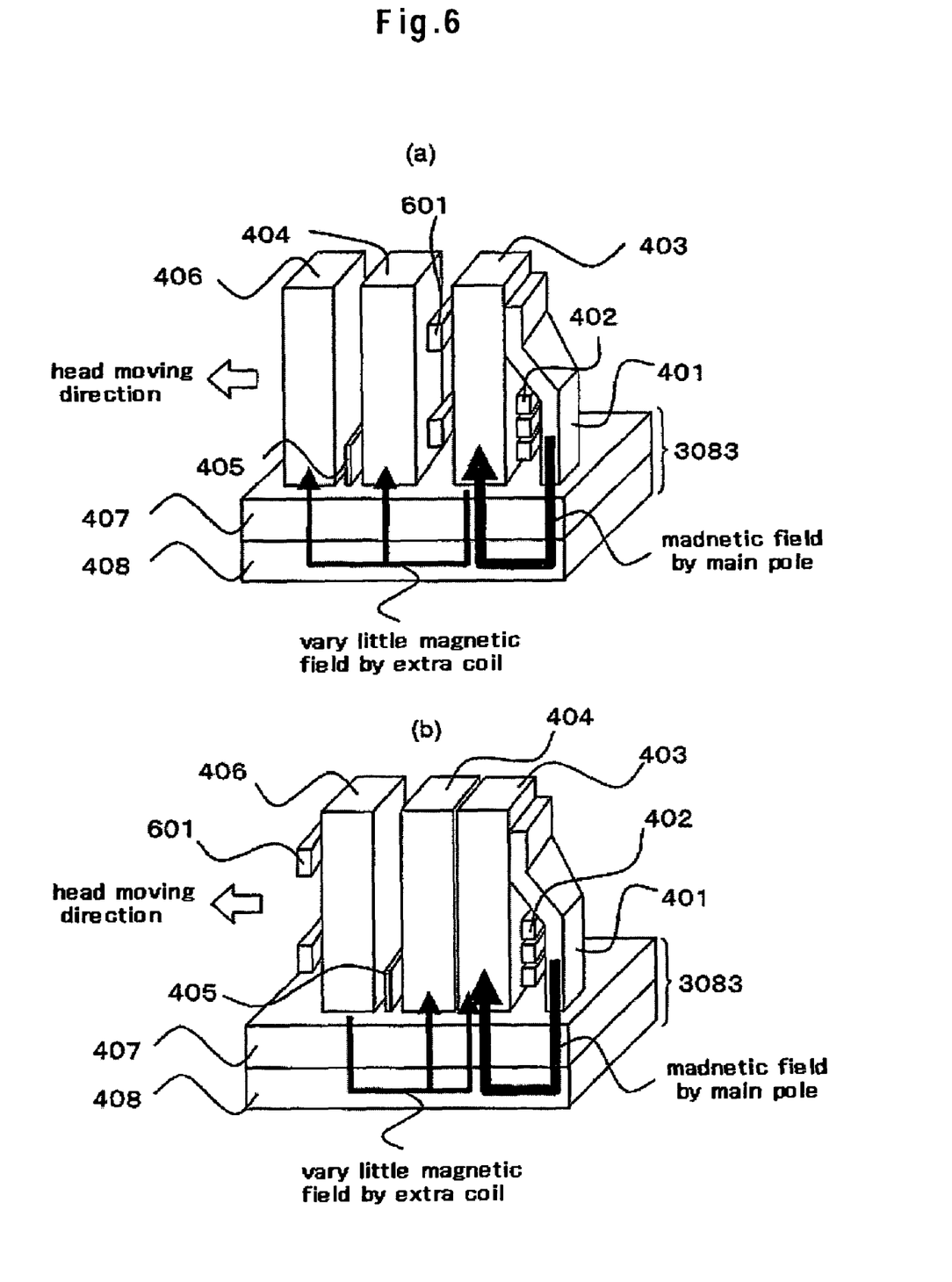
FIG. 6 is a schematic drawing illustrating a configuration example of the read/write head (magnetic field generating coil) according to another embodiment of the present invention.

FIG. 6 illustrates modified examples of the read/write head according to another embodiment of the present invention. The head shown in FIG. 6(a) has a structure arranged from the head moving direction in the order of read head, magnetic field generating coil (extra coil) 601, and recording head. The magnetic field generating coil 601, unlike the excitation coil 402, does not interlink with the magnetic field circuit consisting of the main pole 401 of the single magnetic pole type write head and the auxiliary magnetic pole 403. In the case when a head with this structure is used, an element for generating a predetermined very little DC magnetic field in the soft magnetic layer during the reproducing operation is not the main pole 401, but the magnetic field generating coil 601. In this case, the generated very little DC magnetic field created a magnetic circuit along the auxiliary magnetic pole, the soft magnetic layer, and MR shield. Like the writer-reader reverse structure head, only the MR shield 404 exists between the magnetic field generating coil 601 and the MR reader element 405, so that it makes the excitation energy applied to the magnetic field generating coil 601 smaller, and the effect on the recording magnetic field can be made smaller. FIG. 5C shows a simulation result of a head using this structure. It is understood that the in-plane component of the magnetic field at the location of the MR reader element with an excitation energy of 0.01 AT to the magnetic field generating coil is little over 20 Oe, and it is a strong enough magnitude of an in-plane component magnetic field necessary to move (or delete) magnetic domain walls.

FIG. 6(b) is a drawing illustrating another example of a read/write head in which a magnetic field generating coil is added. Although the read/write head in this embodiment has a structure in which the magnetic field generating coil 601 is placed farther in the head moving direction than the read element 405, the effect obtained is the same as that of the head shown in FIG. 6(*a*).

Although the recording magnetic field generated by the main pole 401 of the write head and a very little DC magnetic field generated by the magnetic field generating coil 601 are illustrated in FIG. 6, these magnetic fields are not generated at the same time. Only the recording magnetic field generated by the main pole 401 is applied to the recording medium 3083 during the recording operation. Moreover, a magnetic field is never applied to the recording medium from the read/write head in a normal condition, but, only when the number of read-retries reaches the retry count threshold R, a very little DC magnetic field is generated from the magnetic field generating coil 601 and applied to the recording medium. This generated DC magnetic field is strong enough to move the magnetic domain walls created in the soft magnetic later 408 and weak enough not to affect to the recording magnetization of the recording magnetic layer or the MR reader element 405. Then, the reproducing operation is executed while applying a very little magnetic field to the soft magnetic layer.

When the head shown in FIG. 4 is used from the above-described head structure, in which a very little magnetic field is generated from the main pole during the reproducing operation, a function is added, where a recording current can flow into the head amplifier circuit driving the read/write head, even during the reproducing operation of the head. Or, a driving circuit for a very little magnetic field is co-installed in the normal head amplifier circuit, and a magnetic field is generated from the write head using the driving circuit for the very little magnetic field when a very little magnetic field is applied. Moreover, as shown in FIG. 6, in the case when a head including a dedicated magnetic field generating element is used, a circuit driving the magnetic field generating element is added in addition to the normal pre-amplifier circuit. This circuit may be a structure embedded in the pre-amplifier circuit.

Figure 7:
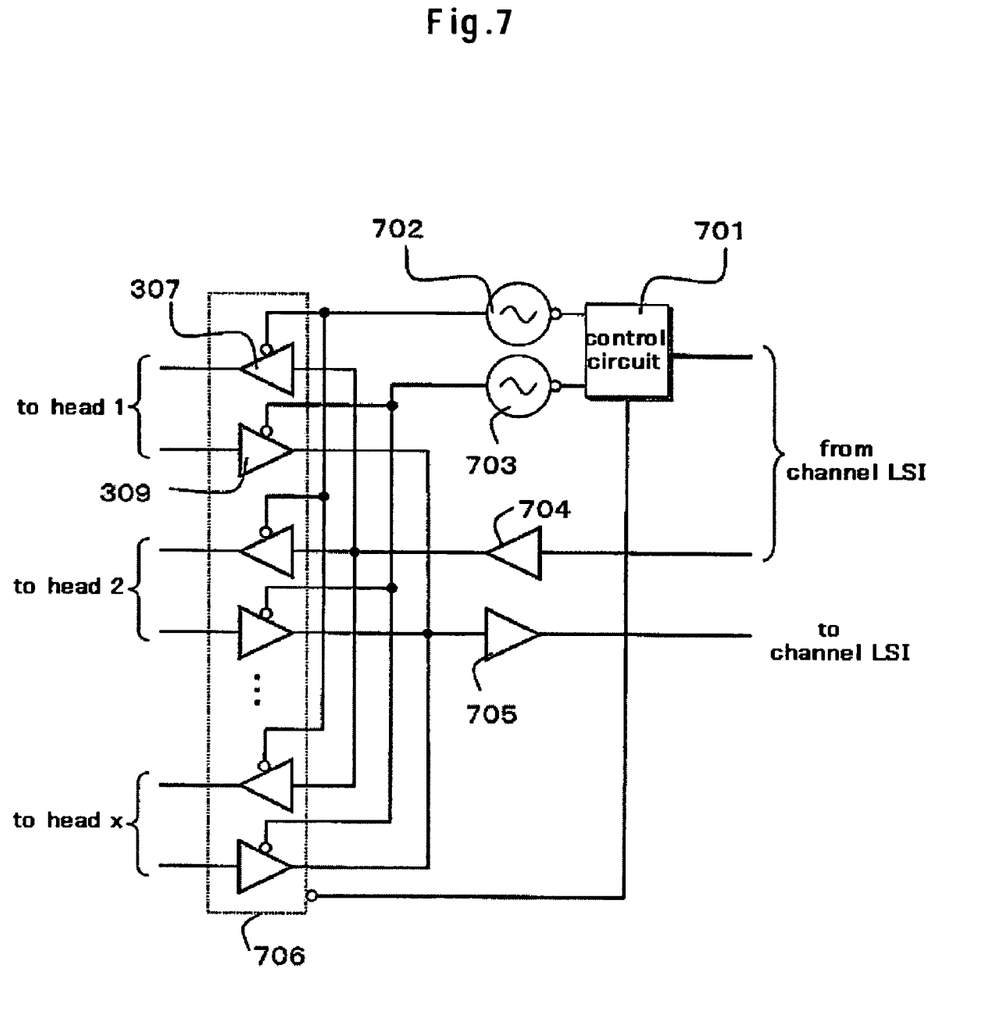
FIG. 7 is a block diagram illustrating a head amplifier.

FIG. 7 is a schematic example illustrating a head amplifier for a read/write head which generates a very little magnetic field from the main pole during the reproducing operation. This head amplifier has a structure in which the control circuit 701 controlling the operation of the amplifier, the current supply 702 supplying the recording current of a predetermined magnitude, the current supply 703 supplying the sense current to the MR reader element, the write buffer 704, the read buffer 705, the head selecting system 706, the write amplifier 307, and the read amplifier 309 are arranged with the same number as the head. The control signal from the channel LSI is input to the control circuit 701. The control signal includes, as serial data, information on the designation of the read/write, which head is used for the read/write, the recording current for it, and the magnitude of the sense current, and it is separated into the control signals going to the recording current supply, the sense current supply, and the head selecting system at the control circuit. The recording current supply, write buffer, and write amplifier become active during the recording operation and the sense current supply, read buffer, and read amplifier operate exclusively to become active.

The head amplifier of the present embodiment has a mode in which the recording current supply and the write amplifier also become active during the reproducing operation.

Figure 8:
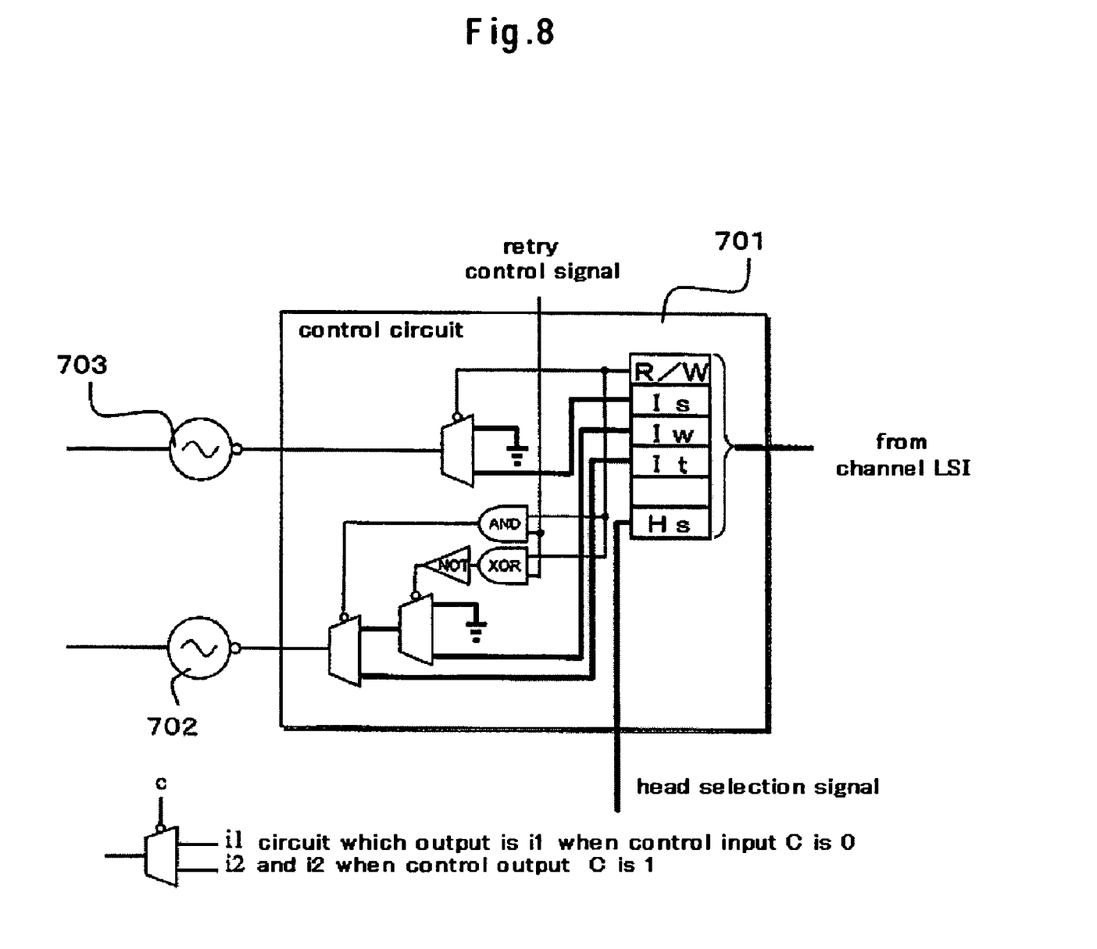
FIG. 8 is a schematic example of the head amplifier control circuit according to an embodiment of the present invention.

FIG. 8 is a schematic example illustrating the control circuit 701 which enables such an operation mode. In FIG. 8, "R/W" is a control signal to be "1" during the reproducing operation and "0" during the recording operation and Is, Iw, and It are the sense current, recording current, and a recording current for generating a very little magnetic field, respectively. Additionally, Hs is the head selection control signal. With a structure where the retry control signal ("0"/"1") is input anew, it is possible to achieve the desired function in the present invention, in which the recording current is active during the recording operation, the sense current supply is inactive (=the sense current is zero), and during the reproducing operation and when the retry control signal is "0", the sense current supply is active and the recording current supply is inactive (=the recording current is zero), and during the reproducing operation and when the retry signal is "1" the sense current supply is active and the recording current supply is active (=the recording current is It).

Figure 9:
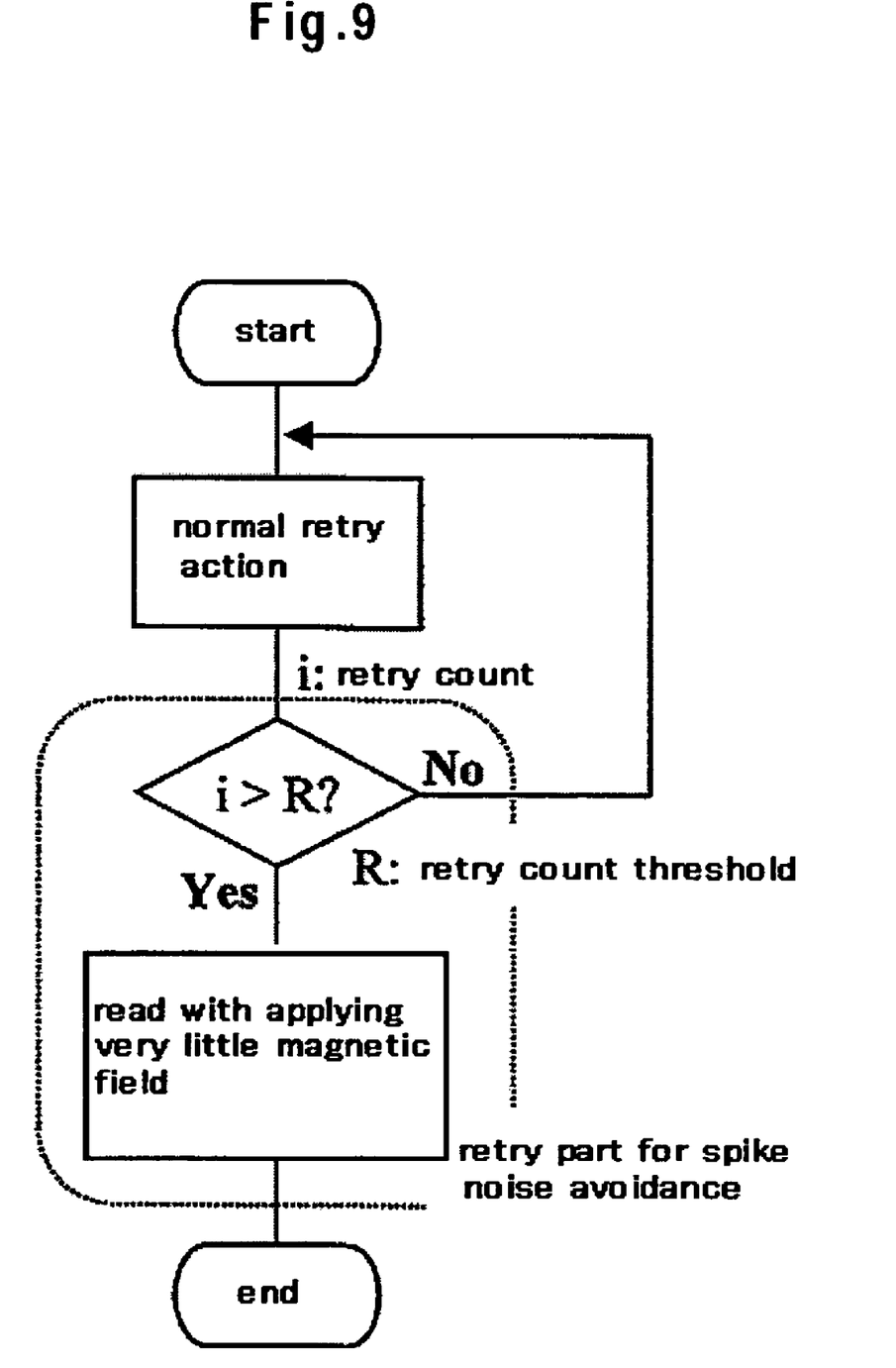
FIG. 9 is a flow chart of the read-retry action according to an embodiment of the present invention.

According to the present invention, the risk of losing data reliability can be reduced compared with applying a regular magnetic field by applying the magnetic field to the soft magnetic layer only for the case when the information cannot be read by the normal reproducing operation. Concretely, in the case when the normal read retry process of the magnetic hard disk drive exceeds the retry count threshold R during reproducing as shown in FIG. 9, it is expected that spike noise will be generated because of the magnetic domain walls, and a read is tried by applying a very little magnetic field to the soft magnetic field from the write head or the magnetic field generating element. For instance, R is expected to be about 100 which is the retry count threshold of the current device, but it is not specified. Moreover, a mechanism, in which a read is tried by stepping up the magnitude of the applied very little DC magnetic field in the range where the magnetic recording layer and read head are not affected, may be taken as a variation of this measure. According to the measures described above, a magnetic hard disk drive with high reliability can be provided even when a recording medium generating spike noise is used.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A magnetic hard disk drive, comprising:
a recording medium including a soft magnetic layer and recording magnetic layer, a read/write head having a write head and a read head, a medium driving part driving said recording medium, an actuator moving said read/write head on said recording medium, and a signal processing circuit being connected to said read/write head,
wherein said signal processing circuit has an operation mode generating a DC magnetic field from said read/write head during a reproducing operation;
wherein said read/write head comprises a single magnetic pole type write head which has a main pole, an auxiliary magnetic pole, and an excitation coil to generate a recording magnetic field from said main pole interlinking with a magnetic circuit having said main pole and auxiliary magnetic pole,
said read/write head comprises a magnetic field generating coil not interlinking with a magnetic circuit that includes said main pole and said auxiliary magnetic pole,
said DC magnetic field is generated by energizing said magnetic field generation coil.

2. A magnetic hard disk drive, comprising:
a recording medium including a soft magnetic layer and recording magnetic layer, a read/write head having a write head and a read head, a medium driving part driving said recording medium, an actuator moving said read/write head on said recording medium, and a signal processing circuit being connected to said read/write head,
wherein said signal processing circuit has an operation mode generating a DC magnetic field from said read/write head during a reproducing operation; and
further comprising a read-retry mechanism to retry reading data when data error is detected, wherein said signal processing circuit makes said read/write head generate a DC magnetic field during reproducing operation when retry occurs more often than a predetermined number.

3. A magnetic hard disk drive according to claim 2, wherein said DC magnetic field is generated from said write head.

4. A magnetic hard disk drive according to claim 2, wherein the magnitude of said DC magnetic field is strong enough to move a magnetic domain wall generated in said soft magnetic layer and weak enough not to affect the magnetization of said recording magnetic layer.

5. A magnetic hard disk drive according to claim 2, wherein the read head comprises an MR reader element; wherein the read head comprises a single magnetic pole type write head having a main pole, an auxiliary magnetic pole, and an excitation coil interlinking with a magnetic field circuit formed by the main pole and the auxiliary magnetic pole; and further comprising a first MR shield and a second MR shield.

6. A magnetic hard disk drive according to claim 5, wherein the read/write head is arranged in a head moving direction in an order of the first MR shield, the MR reader element, the second MR shield, the auxiliary magnetic pole, the excitation coil, and the main pole.

7. A magnetic hard disk drive according to claim 6, wherein the DC magnetic field is generated from the write head.

8. A magnetic hard disk drive according to claim 6, further comprising a magnetic field generating coil which does not interlink with the magnetic field circuit formed by the main pole and the auxiliary magnetic pole, wherein the DC magnetic field is generated by energizing the magnetic field generation coil.

9. A magnetic hard disk drive according to claim 8, wherein the magnetic field generating coil is disposed between the second MR shield and the auxiliary magnetic pole.

10. A magnetic hard disk drive according to claim 8, wherein the magnetic field generating coil is disposed on a side of the first MR shield opposite from the MR reader element.

11. A magnetic hard disk drive according to claim 5, wherein the read/write head is arranged in a head moving direction in an order of the auxiliary magnetic pole, the excitation coil, the main pole, the first MR shield, the MR reader element, and the second MR shield.

12. A magnetic hard disk drive according to claim 11, wherein the DC magnetic field is generated from the write head.

13. A magnetic hard disk drive according to claim 2, wherein the signal processing circuit is configured to allow a recording magnetic field generated by the write head to be applied to the recording medium during a recording operation, and does not generate the DC magnetic field during the recording operation.

14. A magnetic hard disk drive, comprising:
a recording medium including a soft magnetic layer and recording magnetic layer;
a read/write head having a read head; a write head including a main pole, an auxiliary magnetic pole, and an excitation coil interlinking a magnetic circuit formed by the main pole and the auxiliary magnetic pole; and a magnetic field generating coil which does not interlink with a magnetic field circuit that includes the main pole and the auxiliary magnetic pole;
a medium driving part driving the recording medium;
an actuator moving the read/write head on the recording medium; and
a signal processing circuit being connected to the read/write head,
wherein the signal processing circuit has an operation mode generating a DC magnetic field from the magnetic field generating coil of the read/write head during a reproducing operation.

15. A magnetic hard disk drive according to claim 14, wherein the read/write head further includes a pair of MR shields disposed on opposite sides of the MR reader element, and wherein the magnetic field generating coil is disposed between the MR shields and the write head.

16. A magnetic hard disk drive according to claim 14, wherein the read/write head further includes a pair of MR shields disposed on opposite sides of the MR reader element, and wherein the magnetic field generating coil is disposed on a side of the MR shields opposite from the write head.

17. A magnetic hard disk drive according to claim 14, wherein the magnitude of the DC magnetic field is strong enough to move a magnetic domain wall generated in the soft magnetic layer and weak enough not to affect the magnetization of the recording magnetic layer.

18. A magnetic hard disk drive according to claim 14, further comprising a read-retry mechanism to retry reading data when data error is detected, wherein the signal processing circuit makes the read/write head generate a DC magnetic field during reproducing operation when retry occurs more often than a predetermined number.

* * * * *